B. C. GILLIGAN.
BLOWPIPE.
APPLICATION FILED APR. 24, 1909.
976,796.
Patented Nov. 22, 1910.
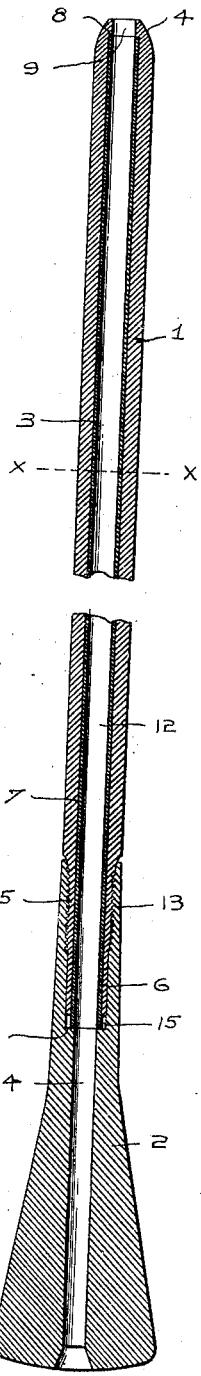
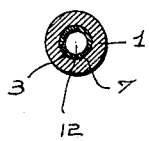
Witnesses—
Kate E. Richmond
H. L. Provin
Inventor—
Bernard C. Gilligan
By Herman H. Martin
Atty

UNITED STATES PATENT OFFICE.

BERNARD C. GILLIGAN, OF TOLEDO, OHIO, ASSIGNOR TO LUVINA A. GILLIGAN, OF TOLEDO, OHIO.

BLOWPIPE.

976,796. Specification of Letters Patent. Patented Nov. 22, 1910.

Application filed April 24, 1909. Serial No. 492,083.

*To all whom it may concern:*

Be it known that I, BERNARD C. GILLIGAN, a citizen of the United States, residing at Toledo, in the county of Lucas and State of Ohio, have invented a new and useful Blowpipe, of which the following is a specification.

My invention relates to a blow-pipe used in the manufacture of glassware, and has for its object to provide an implement of the kind having a non-corrosive lining for the main portion of the bore, from the mouth of said blow-pipe to near its head end, and by so lining the bore of blow-pipes, which are made of iron or steel, prevent accumulation of scale, which latter is induced to form and its propagation is fostered by certain acids and gases in the breath of users, and which scale, being easily detachable, may lodge in a pot of glass or in the cavity of an article in the process of blowing, with damaging effect to either the contents of the glass pot or to the glass article then in the process of blowing.

The objects of my invention are accomplished as hereinafter described and illustrated in the drawings in which—

Figure 1 is a longitudinal section through a blow-pipe constructed in accordance with my invention and Fig. 2 is cross-section through the same on line X X.

My blow-pipe comprises a pipe 1, a detachable head 2 and a non-corrosive lining 3. The top end of the pipe 1 is formed for a mouth-piece 4 by having its wall suitably tapered toward the center of the pipe. The bottom end of the pipe is reduced in diameter for a suitable distance and is threaded to form a coupling section 5, which is preceded by a pilot portion 6, which is of a diameter at or under the depth of the threads of the coupling portion. The pipe 1 is provided with a counterbore 7, which extends from the bottom end of the pipe toward its mouth-piece near which end, a shoulder 8 is formed in which the original bore 9 of the pipe is intact. Within the counterbore 7, there is forcibly pushed a tubular lining 3 to abut against the shoulder 8, and when thus placed, said lining is of a length to have its free end project a suitable distance outward from the pilot end of the pipe for convenience to withdraw said lining. The bore 12 through the tubular lining is equal to the original pipe bore 9 to form a smooth bore at the mouth-piece junction. The detachable head 2 is bulbed at the bottom and by an easy taper terminates into a shaft 13, which preferably equals the diameter of the pipe 1. The head 2 is provided with a bore 14 of a diameter equal to the bore of the tubular lining and is flared at the head outlet. The shaft 13 is provided with a counterbore 15 of a diameter to receive the pilot end of the blow-pipe and is threaded internally inward from the top end to couple with the threaded portion 5 of the blow-pipe. Thus constructed and with the lining in place in the counterbore of the pipe 1, the head 2 is thread-coupled to the pipe with the respective ends of the lining, bearing against the shoulder 8 in the pipe and against the shoulder 16 in the head, whereby a continuous bore is provided for through the built-up pipe, the length of which may be suitably varied.

The lining employed in my pipe is of aluminum or of any other non-corrosive metal upon which saliva or acid in the breath of blowers produces no scale formation or other detachable incrustations incident to acids contained in the breath. In iron pipes used heretofore for glass blowing, the acids in the breath of blowers form, after a time, an incrustation or corrosions upon the walls surrounding the bore of the blow-pipes and when a pipe having its internal wall incrusted is used, flakes or particles of said incrustations or corrosion would become detached and drop into the hot glass and destroy it for use. The liability of thus losing glass by dropping flakes of corrosion or incrustation of the internal pipe walls is avoided by the internal non-corrosive lining of my pipe. Also, by providing a head, detachable from the body of the pipe, the head may be conveniently dressed and replaced or other heads of varying sizes may be coupled to the same pipe body.

What I claim is:

A blow-pipe, comprising tube sections of unequal length, detachably coupled, and of which sections, the short section is formed as the head of the pipe and the long section forming the main body of the pipe and terminating in a mouthpiece; a counter-bore through the main body of the pipe, terminating with a shoulder at the mouth opening into the bore of the pipe, a counter-bore of equal diameter as the main body of the pipe and formed in the end of the head of the pipe joining the mouth section, a tubular non-corrosive lining press-fitted in the counter-bore of the main body of the pipe and abutting the shoulder, and being of a length to enter as a pilot the counter-bore of the head, when the pipe sections are joint coupled.

In witness whereof, I have hereunto set my hand this 22nd day of April, 1909.

BERNARD C. GILLIGAN.

Witnesses:
C. H. RAUCH,
C. O. RICHEY.